Nov. 9, 1954  M. G. SOGGE  2,693,823
PILOT CONTROLLED DIAPHRAGM VALVE AND PRESSURE REGULATOR
Filed Dec. 24, 1949
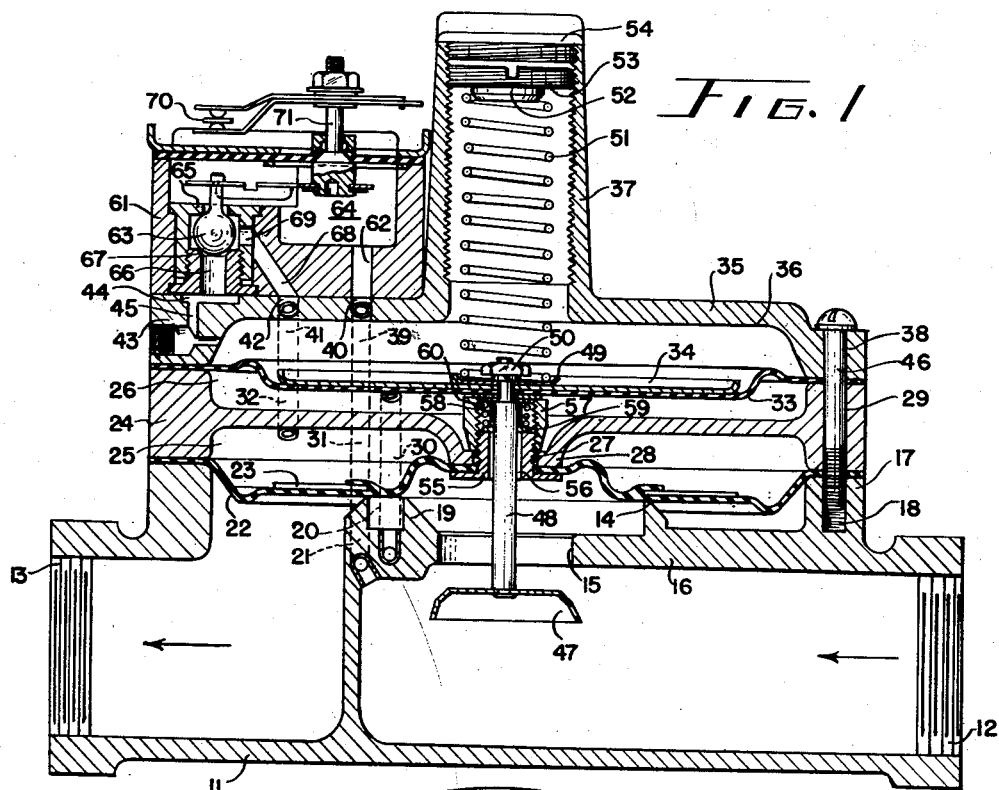
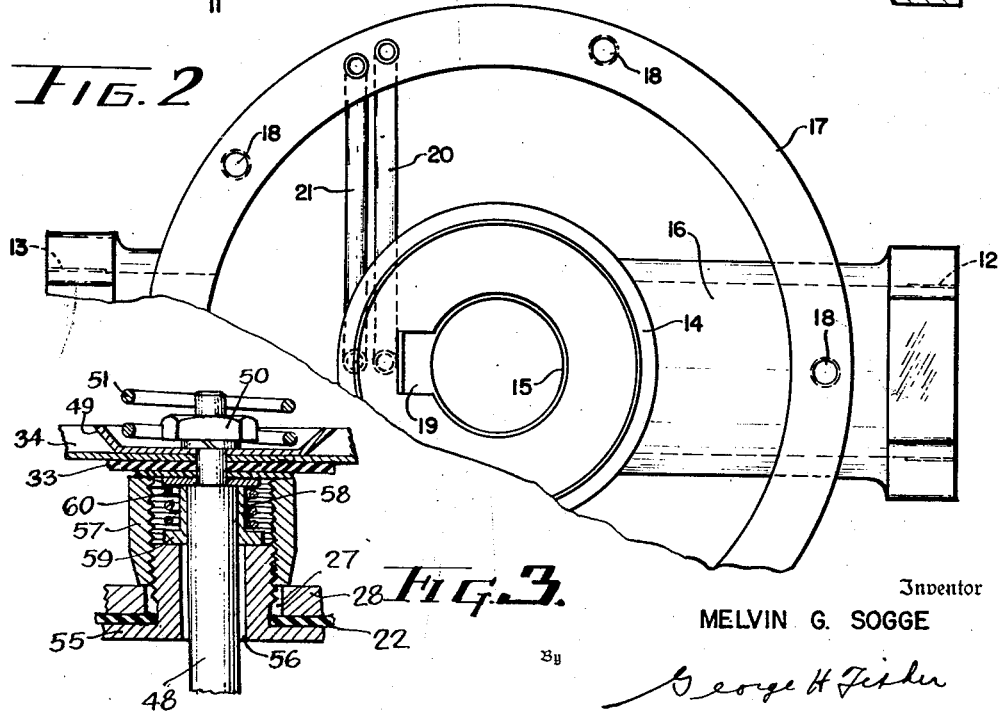
Inventor
MELVIN G. SOGGE
By George H. Fisher
Attorney

United States Patent Office 2,693,823
Patented Nov. 9, 1954

2,693,823

PILOT CONTROLLED DIAPHRAGM VALVE AND PRESSURE REGULATOR

Melvin G. Sogge, St. Louis Park, Minn., assignor to Minneapolis-Honeywell Regulator Company, Minneapolis, Minn., a corporation of Delaware Application December 24, 1949, Serial No. 134,981

11 Claims. (Cl. 137—614.21)

The invention described herein relates to improvements in a regulator valve of the type having a pilot valve controlled diaphragm valve and a pressure regulating valve in series. Valves of this general type are well known in the art, so the novelty in this invention must obviously lie in the particular arrangement or combination of elements, and/or in the details of the elements.

One of the objects of this invention is to provide a valve of the type described which will be of simple yet sturdy construction and provide reliable and steady operation.

Another object of the invention is to provide a combined diaphragm valve and pressure regulator wherein both the diaphragm valve and the pressure regulating diaphragm are both positioned above their respective valve seats.

A further object of the invention is to provide a pressure regulator diaphragm valve wherein a central portion of the diaphragm valve is fixed and the stem of the pressure regulating valve extends reciprocably therethrough.

Still a further object of the invention is to provide, in a combined diaphragm valve and pressure regulator, means in the form of a dam upstream of one end of a pressure regulator passage and between the valve seats, to counterbalance the effect produced by the changing effective pressure area of a diaphragm actuating the pressure regulating valve and the changing force produced by the spring.

A still further object of the invention is to provide a combined diaphragm valve and pressure regulating valve wherein the closing of the diaphragm valve will cause closing of the pressure regulator valve.

Further objects of the invention will become apparent upon reading the following detailed description of the invention in conjunction with the accompanying drawings wherein:

Figure 1 is a cross-sectional view of the valve on the longitudinal axis thereof;

Figure 2 is a plan view of the valve body portion thereof per se; and

Figure 3 is an enlarged view of a valve stem sealing structure in the valve.

The regulator valve comprises a main body portion 11 having a threaded inlet 12, a threaded outlet 13, a main diaphragm valve seat 14, and a fluid flow passage 15 coaxial with the valve seat 14 and passing through a partition wall 16 between the inlet and the outlet. The body has an open top portion forming an annular rim 17 in which are machined a plurality of threaded bores 18. A dam 19 is formed on the upper surface of the partition wall 16 in the direct line of flow from the inlet 12 to the outlet 13 and spaced from the adjacent side of the valve seat 14. A pipe 20 is cast in the walls of the body 11 with one end thereof flush with the surface of the rim 17 and the other end thereof flush with the upper surface of partition 16 between the dam 19 and the valve seat 14. Another pipe 21 is cast in the walls of the body 11 with one end thereof flush with the surface of the rim 17 and the other end thereof extending to the inlet side of the partition 16.

A diaphragm 22 is provided, having a washer-like metallic backing plate 23 thereon, and a large opening in the center thereof and a plurality of small openings in the peripheral marginal edge thereof for alignment with the bores 18 in the body 11.

A partition wall member 24 having an annular recess 25 in the lower side thereof, a recess 26 in the upper side thereof and a bore 27 extending through a downwardly recessed central portion 28, is positioned over the rim 17 of the body 11 with the diaphragm 22 therebetween. Spaced holes 29, of slightly larger diameter than the threaded bores 18 in the body 11, are so spaced that each will be in axial alignment with a corresponding one of the bores 18, when assembled. A pipe 30 is molded in the wall of the partition member 24 with one end thereof in communication with the recess 26 and the other end thereof flush with the lower surface of the partition 24 in axial alignment with the adjacent end of the pipe 20 in the body member 11. A pipe 31 is likewise molded in the wall of partition 24 and extends from the lower surface thereof in axial alignment with the adjacent end of pipe 21 in body 11 to the top surface of the partition member 24. A third pipe 32 is molded in the wall of partition member 24 and extends from the lower recess 25 to the upper surface of the partition member.

A diaphragm 33, having a backing plate 34, is positioned with an annular marginal portion thereof positioned on the upper surface of the partition member 24. This marginal portion of the diaphragm 33 has apertures therein which are in alignment with the bores 29 and pipes 30, 31 and 32.

A cap member 35 has a recess 36 in the lower surface thereof and an internally threaded stack portion 37 in axial alignment with the passages 15 in the body member 11 and 27 in the partition member 24. This cap member also has a plurality of spaced bores 38 which are in axial alignment with the bores 29 in the partition member 24. A pipe 39 extends from the lower surface of the cap member, in axial alignment with the pipe 31, to a recess 40 in the upper surface of the cap member. Another pipe 41 extends from the lower surface of the cap member, in axial alignment with the pipe 32 in partition member 24, to a recess 42 in the upper surface of the cap member 35. A threaded bore 43 extends through a side wall of the recess 36 and is in communication with a recess 44 in the upper surface of the cap member 35 through a passage 45. A plurality of bolts 46 extend through bores 38 and 29 and are screw-threaded into bores 18 in member 11, and thus sealingly clamp the diaphragms 22 and 33 between the body member 11 and partition 24 and cap 35, respectively.

An inverted cup-shaped throttling valve 47 having a stem 48 riveted thereto, is positioned below the lower end of passage 15 with the stem 48 extending upwardly therethrough and secured at its upper end to the diaphragm 33. The upper end of the stem 48 is secured to the diaphragm 33 by having a reduced portion thereof extend through a small aperture in the diaphragm 33 and plate 34 and a spring centering cup 49, with a nut 50 screw threaded on the upper end of the stem and clamping the elements together.

A compression spring 51 is positioned within the stack 37 with the lower end thereof centered around the upper end of the stem 48 by means of the centering cup 49. The upper end of the spring 51 fits around a centering boss 52 on a screw-threaded adjustable abutment member 53. A threaded plug 54 closes the upper end of the stack 37 to prevent the accumulation of dirt therein.

A headed and externally threaded sleeve 55 having a bore 56 of substantially larger diameter than the diameter of stem 48, extends upwardly through the bore 27 with the head thereof pressing an annular central portion of the diaphragm 22 against the lower surface of the portion 28. A nut or internally threaded sleeve member 57 is screw threaded on the upper end of sleeve 55 and bears against the upper surface of portion 28 to clamp the diaphragm 22 sealingly against the portion 28, thus forming a pressure chamber between the diaphragm 22 and recess 25.

In order to prevent excessive flow of fluid from below the diaphragm 22 around the stem 48 into recess 26, a bearing collar or sleeve 58, having an outwardly and radially extending flange 59, snugly fits around the stem 48 with the lower surface of the flange 59 resting on the upper end of the sleeve 55. The flange 59 is laterally slidable on the end of the sleeve 55 due to the fact that the outer diameter thereof is less than the inner diameter of the sleeve 57. This permits slight transverse movement of the valve stem 48 during its vertical movement to prevent binding thereof in the sleeve 48. The flange 59 is held snugly against the end of the sleeve 55 by means of a compression spring 60 encircling the collar 58 and extending from the upper surface of the flange 59 to a washer on the underside of the diaphragm 33. As the stem 48 and valve 47 move upwardly, the spring 60 expands, holding the flange 59 against the end of sleeve 55.

Mounted on the upper surface of the cap member 35 to one side of the stack 37, and secured thereto by means of bolts (not shown), is a three way pilot valve 61. Details of this pilot valve or diaphragm controller are fully disclosed in a William L. Huntington patent application No. 749,493, filed May 21, 1947, now abandoned, so, therefore, form no part of this invention other than as means broadly for controlling the flow of fluid through the passages of the valve body, partition wall and cap member described above. As any other three way pilot valve may, by slight modification, be adapted for use with this control valve, only a few of the basic details of the diaphragm controller 61 will be described. The diaphragm controller has a passage 62 which establishes communication between the recess 40 and the top of valve 63 through a chamber 64 and valve seat 65. A passage 66 establishes communication between recess 44 and the bottom of valve 63 through valve seat 67. A passage 68 extends from recess 42 to the side of valve 63 through a port 69 which is constantly spaced from the valve 63 so as to permit the flow of fluid between port 69 and either valve seat 65 or valve seat 67, depending upon which one is open. The valve 63 is actuated by the armature 70 of an electromagnet (not shown) through a generally U-shaped lever 71.

*Operation*

In Figure 1 of the drawing, the elements of the valve are shown in the positions they would have at the instant the diaphragm valve 22 seats on valve seat 14. That is, the pressure regulator valve 47 is still fairly wide open due to the fact that the pressure in chamber 26 has not yet reached inlet pressure by the flow of fluid through pipe 30. It will be noted that in this position, the valve 63 is resting on valve seat 67 to prevent the flow of fluid from chamber 25 but to permit the flow of fluid through valve seat 65 from the inlet 12 to the chamber 25. The path of fluid flow would be through pipe 31, pipe 39, recess 40, passage 62, chamber 64, valve seat 65, port 69, passage 68, and pipes 41 and 32 to chamber 25.

To initiate the flow of fluid through the valve body 11, armature 70 is caused to move upwardly, lifting valve 63 from valve seat 67 and into engagement with valve seat 65. This seals off chamber 25 from the inlet 12 but establishes communication between chamber 25 and the atmosphere through pipe 32, pipe 41, passage 68, port 69, valve seat 67, passage 66, recess 44, and bore 43. If desired, a pipe may be threaded into bore 43 to conduct the fluid to any low pressure point, such as a point immediately above or adjacent a burner in a furnace, if the fluid happens to be a combustible gas. With the bleeding of fluid from chamber 25, the diaphragm 22 lifts off seat 14 and permits the fluid above valve 47 to flow through the outlet 13 to a low pressure point, such as a main burner of a gas furnace. As the chamber 26 is connected to the space between the regulator valve 47 and the diaphragm valve 22 by pipes 30 and 20 extending from said chamber 26 to the space behind the dam 19, the pressure in 26 will immediately reduce, permitting the diaphragm 33 to lower by gravity and by the bias of spring 51 to a position wherein the valve 47 is substantially spaced from the lower end of opening 15.

As the fluid flows from the inlet 12 to the outlet 13, the diaphragm 33 will move up and down in response to outlet pressure and the rate of fluid flow past the dam 19 in a manner well known in the art. It will be observed that regardless of the pressure on the underside of diaphragm 22, valve 47 will be unaffected thereby except as positioned by said pressure on the diaphragm 33. It will further be observed that an excessive amount of fluid will not leak past the stem 48 to chamber 26 due to the fact that bearing collar 58 snugly engages the stem 48 and is maintained in fluid tight abutting relationship with the upper end of sleeve 55 by the expandable spring 60. Thus, the only forces acting on the underside of diaphragm 33, aside from the negligible force imparted thereto by the light spring 60, is the pressure sensed at the end of pipe 30 at the surface of partition wall 16, behind the dam 19. Except for the more accurate and steadier operation of the pressure regulator valve of this invention, the operation thereof is otherwise the same as a conventional pressure regulator which makes use of a dam to modify the downstream pressure sensed by the pressure regulator. Once the flow through the valve body has become steady, the regulator valve 47 will assume a balanced position and will remain in this position, except for slight corrective movements due to slight variations in the supply pressure, until the valve 63 has been moved to the starting or valve shutdown position.

With the valve 63 resting on valve seat 67, fluid at inlet pressure will again flow to chambers 25 and 26 in the manner described above and cause diaphragm 22 to engage valve seat 14 and diaphragm 33 to lift valve 47 against the lower end of opening 15.

The outlet pressure of the regulator valve may be varied by removing the threaded plug 54 and screwing the abutment 53 upwardly or downwardly depending upon whether a lower or higher outlet pressure is desired.

From the above description of the invention, it is apparent that applicant has created a combination diaphragm valve and pressure regulator valve, wherein both the diaphragm of the diaphragm valve and the diaphragm of the pressure regulator valve are positioned above the main valve seat, to prevent the accumulation of foreign matter thereon, without sacrificing the accuracy, steadiness and reliability of the pressure regulator valve. Heretofore, furnace installations, anywhere near equal in performance to those using the above described combination, have had the pressure regulator valve separate from the main diaphragm valve.

As it will be apparent to those skilled in the art that modifications may be made in the above described invention without departing from the spirit thereof, it is to be understood that the scope of the invention is to be determined solely by the appended claims.

I claim as my invention:

1. A valve comprising an open top casing having an inlet and an outlet and a main valve seat therebetween, a flow passage of smaller diameter than said valve seat and coaxial therewith, a dam between said passage and said main valve seat, a partition member having a recess on each side thereof and spanning the open top of said casing, said partition member having an opening therein coaxial with said flow passage, a first apertured and flexible diaphragm positioned between said casing and said partition and engageable with said main valve seat, a headed sleeve extending through the aperture in said first diaphragm and opening in said partition member, means engaging said sleeve and sealingly clamping a central annular portion of said diaphragm against said partition member, a second flexible diaphragm extending across the top of said partition member, an inverted cup-shaped regulating valve positioned on the opposite side of said flow passage from said first diaphragm, a stem extending from said regulating valve through said flow passage and through said headed sleeve and secured at its upper end to said second diaphragm, a transversely movable bearing sleeve sealingly encircling said stem and having an outwardly extending flange resting on the upper end of said headed sleeve, a light compression spring between said flange and said second diaphragm for holding said flange against said end of said headed sleeve, a cap member positioned above and spanning said second diaphragm and partition member, a compression spring positioned between said cap member and said second diaphragm, means for adjusting the position of the cap end of said spring to vary the force thereof on said second diaphragm, a three-way pilot valve positioned on said cap member and having a bleed valve seat and a supply valve seat and an intermediate constantly open port, a first passage between said inlet and said supply valve seat, a second passage extending from the upper recess in said partition member to the space between said dam and said main valve seat, a third passage extending from the lower recess in said partition to said port, and a fourth passage extending from said bleed valve seat to the atmosphere.

2. A valve comprising an open top casing having an inlet and an outlet and a main valve seat therebetween, a flow passage of smaller diameter than said valve seat and substantially coaxial therewith, a dam between said passage and said main valve seat, a rigid partition member having a recess on each side thereof and spanning the open top of said casing, said partition member having an opening therein substantially coaxial with said flow passage, a first apertured and flexible diaphragm positioned between said casing and said partition and engageable with said main valve seat, a headed and externally threaded sleeve extending through the aperture in said first diaphragm and opening in said partition member, a nut engaging said sleeve and sealingly forcing a portion of said diaphragm against said partition member, a second flexible diaphragm extending across the top of said partition member, a regulating valve positioned on the opposite side of said flow passage from said first diaphragm, a stem extending from said regulating valve through said flow passage and through said sleeve and secured at its upper end to said second diaphragm, a transversely movable bearing sleeve sealingly encircling said stem and having an outwardly extending flange resting on the upper end of said sleeve, a light compression spring between said flange and said second diaphragm for holding said flange against said sleeve end, a cap member positioned above and spanning said second diaphragm and partition member, a compression spring positioned between said cap member and said second diaphragm, a three-way pilot valve positioned on said cap member and having a bleed valve seat and a supply valve seat and an intermediate constantly open port, a first passage between said inlet and said supply valve seat, a second passage extending from the upper recess in said partition member to the space between said dam and said main valve seat, a third passage extending from the lower recess in said partition to said port, and a fourth passage extending from said bleed valve seat to the atmosphere.

3. A valve comprising an open top casing having an inlet and an outlet and a main valve seat therebetween, a flow passage of smaller diameter than said valve seat and coaxial therewith, a dam between said passage and said main valve seat, a rigid partition member having a recess on each side thereof and spanning the open top of said casing, said partition member having an opening therein coaxial with said flow passage, a first apertured and flexible diaphragm positioned between said casing and said partition and engageable with said main valve seat, tubular means extending through the aperture in said first diaphragm and opening in said partition member and sealingly forcing a portion of said diaphragm against said partition member, a second flexible diaphragm extending across the top of said partition member, an inverted cup-shaped regulating valve positioned on the opposite side of said flow passage from said first diaphragm, a stem extending from said regulating valve through said flow passage and sealingly through said tubular means and secured at its upper end to said second diaphragm, a cap member positioned above and spanning said second diaphragm and partition member, biasing means positioned between said cap member and said second diaphragm, a three-way pilot valve positioned on said cap member and having a bleed valve seat and a supply valve seat and an intermediate constantly open port, a first passage between said inlet and said supply valve seat, a second passage extending from the upper recess in said partition member to the space between said dam and said valve seat, a third passage extending from the lower recess in said partition to said port, and a fourth passage extending from said bleed valve seat to the atmosphere.

4. In a diaphragm valve, the combination comprising an open top valve body having an inlet and an outlet and a valve seat therebetween, an apertured diaphragm valve spanning the open top of said valve body and valve seat, an apertured rigid wall member also spanning said open top and pressing a marginal edge of said diaphragm valve against said body, means for alternately controlling and directing fluid from said inlet to the space between said diaphragm valve and said wall member and for bleeding fluid from said space to the atmosphere, a regulator valve positioned between said inlet and valve seat for regulating fluid flow and having a stem thereon which extends freely through the apertures in said diaphragm and wall member, means responsive to the rate of fluid flow in said valve body positioned above said rigid wall member and operably connected to said stem, means slidably and sealingly engaging said valve stem and pressing a central portion of said diaphragm valve against said wall member, and a passage extending from the space between said regulator valve and said diaphragm valve to said means responsive to the rate of fluid flow in said valve body.

5. In a diaphragm valve, the combination comprising an open top valve body having an inlet and an outlet and a valve seat therebetween, an apertured diaphragm valve spanning the open top of said valve body and valve seat, an apertured wall member also spanning said open top and pressing a marginal edge of said diaphragm valve against said body, means for alternately controlling and directing fluid from said inlet to the space between said diaphragm and said wall member and for bleeding fluid from said space to the atmosphere, a valve positioned between said inlet and valve seat for regulating fluid flow and having a stem thereon which extends freely through the apertures in said diaphragm and wall member, means responsive to the rate of fluid flow in said valve body operably connected to said stem, means sealingly engaging said valve stem and pressing a central portion of said diaphragm valve against said wall member, said sealing means comprising two tubular members of different diameters encircling said stem and in end to end telescoping relationship, and a passage extending from the space between said diaphragm valve and regulator valve to said rate responsive means.

6. A valve comprising an open top casing having an inlet and an outlet and a main valve seat therebetween, a flow passage of smaller diameter than said valve seat and substantially coaxial therewith, a partition member having a recess on each side thereof and spanning the open top of said casing, said partition member having an opening therein substantially coaxial with said flow passage, a first apertured and flexible diaphragm positioned between said casing and said partition and engageable with said main valve seat, tubular means extending through the aperture in said first diaphragm and opening in said partition member and sealingly clamping a portion of said diaphragm against said partition member, a second flexible diaphragm extending across the top of said partition member, a regulating valve positioned on the opposite side of said flow passage from said first diaphragm, a stem extending from said regulating valve freely through said flow passage and through said tubular means and secured at its upper end to said second diaphragm, a transversely movable bearing sleeve sealingly encircling said stem and having an outwardly extending flange resting on the upper end of said tubular means, a light compression spring between said flange and said second diaphragm for holding said flange against said upper end of the tubular means, a cap member positioned above and spanning said second diaphragm and partition member, a compression spring positioned between said cap member and said second diaphragm, a three-way pilot valve positioned on said cap member and having a bleed valve seat and a supply valve seat and an intermediate constantly open port, a first passage between said inlet and said supply valve seat, a second passage extending from the upper recess in said partition member to the space between said flow passage and said main valve seat, a third passage extending from the lower recess in said partition to said port, and a fourth passage extending from said bleed valve seat to the atmosphere.

7. A valve comprising an open top casing having an inlet and an outlet and a main valve seat therebetween, a flow passage of smaller diameter than said valve seat and substantially coaxial therewith, a rigid partition member having a recess on each side thereof and spanning the open top of said casing, said partition member having an opening therein substantially coaxial with said flow passage, a first apertured and flexible diaphragm positioned between said casing and said partition and engageable with said main valve seat, a headed and externally threaded sleeve extending through the aperture in said first diaphragm and opening in said partition member, a nut engaging said sleeve and sealingly forcing a portion of said diaphragm against said partition member, a second flexible diaphragm extending across the top of said partition member, a regulating valve positioned on the opposite side of said flow passage from said first diaphragm, a stem extending from said regulating valve through said flow passage and sealingly through said sleeve and secured at its upper end to said second diaphragm, a cap member positioned above and spanning said second diaphragm and partition member, a compression spring positioned between said cap member and said second diaphragm, a three-way pilot valve positioned on said cap member and having a bleed valve seat and a supply valve seat and an intermediate constantly open port, a first passage between said inlet and said supply valve seat, a second passage extending from the upper recess in said partition member to the space between said flow passage and said main valve seat, a third passage extending from the lower recess in said partition to said port, and a fourth passage extending from said bleed valve seat to the atmosphere.

8. In a diaphragm valve, the combination comprising an open top valve body having an inlet and an outlet and a valve seat therebetween, an apertured diaphragm spanning the open top of said valve body and cooperable with said valve seat to control fluid flow therethrough, an apertured rigid wall member also spanning said open top and pressing a marginal edge of said diaphragm against said body, means for alternately controlling and directing fluid from said inlet to the space between said diaphragm and said wall member and for bleeding fluid from said space to the atmosphere, a valve positioned between said inlet and valve seat for regulating fluid flow and having a stem thereon which freely extends through the apertures in said diaphragm and wall member, means responsive to the rate of fluid flow in said valve body operably connected to said stem, means sealingly engaging said valve stem and pressing a marginal portion of said diaphragm around the aperture therein against said wall member, said rate responsive means comprising a diaphragm positioned above said apertured wall member and operably connected to said valve stem, and a passage extending from the space between said valve seat and said valve to the space between said last named diaphragm and said wall member.

9. In a diaphragm valve, the combination comprising an open top valve body having an inlet and an outlet and a valve seat therebetween, an apertured diaphragm valve spanning the open top of said valve body and valve seat, an apertured rigid wall member also spanning said open top and sealingly pressing a marginal edge of said diaphragm valve against said body, means for alternately controlling and directing fluid from said inlet to the space between said diaphragm valve and said wall member and for bleeding fluid from said space to the atmosphere, a regulator valve positioned between said inlet and valve seat for regulating fluid flow and having a stem thereon which freely extends through the aperture in said diaphragm valve, means responsive to the rate of fluid flow in said valve body operably connected to said stem, means sealingly engaging said valve stem and pressing a central portion of said diaphragm valve against said wall member around the aperture therein, and a fluid flow connection between a space between said diaphragm valve and said regulator valve and said rate responsive means.

10. The combination as defined in claim 9 wherein said means sealingly engaging said valve stem comprises a sleeve loosely encircling said stem and engaging said diaphragm and a closely fitting collar sealingly encircling said stem and biased sealingly against said sleeve, said collar being transversely slidable on the abutting surface of said sleeve.

11. The combination of claim 10 wherein the bias for said sleeve is provided by resilient means.

References Cited in the file of this patent
UNITED STATES PATENTS

| Number | Name | Date |
|---|---|---|
| 2,226,761 | Fox | Dec. 31, 1940 |
| 2,288,733 | Niesemann | July 7, 1942 |
| 2,314,266 | Beam | Mar. 16, 1943 |
| 2,361,632 | Jones | Oct. 31, 1944 |
| 2,381,799 | Berkholder | Aug. 7, 1945 |